US012780447B2

(12) United States Patent
Mackin et al.

(10) Patent No.: US 12,780,447 B2
(45) Date of Patent: Nov. 3, 2026

(54) SYSTEMS AND APPARATUS FOR PROVIDING GROUND SUPPORT SERVICES TO AIRCRAFTS

(71) Applicant: The Boeing Company, Arlington, VA (US)

(72) Inventors: Steve Mackin, Arlington, VA (US); Efrem Ayichew, Arlington, VA (US)

(73) Assignee: The Boeing Company, Arlington, VA (US)

( * ) Notice: Subject to any disclaimer, the term of this patent is extended or adjusted under 35 U.S.C. 154(b) by 8 days.

(21) Appl. No.: 18/302,342

(22) Filed: Apr. 18, 2023

(65) Prior Publication Data

US 2024/0351707 A1 Oct. 24, 2024

(51) Int. Cl.
*B64F 1/35* (2024.01)
*B64F 1/223* (2024.01)

(52) U.S. Cl.
CPC .............. *B64F 1/352* (2024.01); *B64F 1/224* (2013.01)

(58) Field of Classification Search
CPC .................................. B64F 1/34; B64F 1/224
See application file for complete search history.

(56) References Cited

U.S. PATENT DOCUMENTS 4,684,825 A * 8/1987 Sachs ........................ B64F 1/34 307/328
6,568,203 B1 * 5/2003 Leathers ................. B64F 1/362 62/402
9,902,505 B2 * 2/2018 Dahl ........................ B64F 1/362
11,548,402 B2 * 1/2023 Cesiel ...................... B60L 53/62
2002/0163196 A1 * 11/2002 Brofft ...................... F02B 63/04 290/1 A
2004/0011918 A1 * 1/2004 Musial .................... B64F 1/352 244/1 R
2005/0076965 A1 * 4/2005 Buckner ............... B60P 3/2245 137/899.4
2005/0274507 A1 * 12/2005 Sanada ................... F28F 9/002 62/239
2008/0250803 A1 * 10/2008 Leadingham ........... B64F 1/364 62/236
2011/0030414 A1 * 2/2011 Newell ..................... H02P 4/00 318/808
2012/0049633 A1 * 3/2012 Leadingham ........... B64F 1/352 307/80

(Continued)

Primary Examiner — Kurt Philip Liethen
(74) Attorney, Agent, or Firm — Harrity & Harrity, LLP

(57) ABSTRACT

The present application relates to systems and apparatus for providing ground support services to aircrafts. An exemplary system may include a ground support apparatus. The ground support apparatus may include at least one motor controller configured to receive input power and to supply output power. The ground support apparatus may also include a motor configured to receive the output power from the at least one motor controller. The motor may include a rotatable motor shaft. Further, the ground support apparatus may include a gearbox having an input shaft and an output shaft. The input shaft may be coupled to the rotatable motor shaft of the motor. Additionally, the ground support apparatus may include a compressor configured to generate compressed air. The compressor may include an impeller coupled to a compressor shaft and the compressor shaft may be coupled to the output shaft of the gearbox.

21 Claims, 3 Drawing Sheets

(56) References Cited

U.S. PATENT DOCUMENTS

| | | | | |
|---|---|---|---|---|
| 2014/0245727 | A1* | 9/2014 | Kahn | F02C 7/277<br>60/325 |
| 2017/0158476 | A1* | 6/2017 | Brunckhorst | B66F 9/07504 |
| 2017/0297743 | A1* | 10/2017 | Tindall | H02K 5/207 |
| 2017/0355259 | A1* | 12/2017 | Borud | B60L 7/14 |
| 2018/0202528 | A1* | 7/2018 | Buschur | F02B 39/08 |
| 2019/0071190 | A1* | 3/2019 | Nestel | B64F 1/352 |
| 2019/0234312 | A1* | 8/2019 | Eckhoff | B64F 1/34 |
| 2020/0386249 | A1* | 12/2020 | Adamson | B64F 5/40 |
| 2021/0122487 | A1* | 4/2021 | Hagshenas | B64D 41/00 |
| 2021/0122488 | A1* | 4/2021 | Swain | B64D 27/10 |

* cited by examiner

SYSTEMS AND APPARATUS FOR PROVIDING GROUND SUPPORT SERVICES TO AIRCRAFTS

GOVERNMENT LICENSE RIGHTS

This invention was made with Government support under FA8628-19-D-1000 awarded by the Department of Defense. The government has certain rights in this invention.

FIELD

The present application relates generally to ground support equipment for vehicles. More specifically, the present application relates to ground support systems to provide pressurized or compressed air for one or more systems of an aircraft.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Commercial aircraft typically utilize two or more primary gas turbine engines (e.g., turbo jet engines) for propulsion. The turbine engines may also be used to drive other rotating components of the aircraft, such as generators and pumps. Further, the turbine engines may supply high pressure air to the aircraft's environmental control system, which may be used to supply temperature-controlled air to both the aircraft cabin and to electronic equipment within the aircraft.

When an aircraft is at a terminal or otherwise on the ground, an onboard auxiliary power unit (APU) may be used to provide support services of various types (e.g., utilities, air, etc.) especially when the aircraft engines are not powered up or operating. For example, the APU may provide electrical power to the onboard electrical equipment of the aircraft. In addition, the APU may be used to supply high pressure air to operate the environment control system of the aircraft to maintain a desired air temperature in the interior of the aircraft. Further, the APU may be configured to supply high pressure air for starting the aircraft engines.

When an aircraft is not equipped with an onboard APU or the APU is not operational or in use, an external ground starter cart may be used to start the engines of the aircraft. The ground starter cart usually includes an air source to produce air for the aircraft. The air source may be configured to create high pressure air for starting the aircraft engines. The ground starter cart may provide the high pressure air to the aircraft by one or more hoses or conduits.

Traditionally, the ground starter cart includes a gas turbine engine (e.g., a gas combustion engine) for driving the air source to supply the high pressure air for starting the engines of the aircraft. However, the use of a gas turbine engine for ground starter carts has been associated with a number of hazards and/or disadvantages. For example, a gas turbine engine can be expensive, noisy, and have poor fuel efficiency. Further, the ground starter cart may dispense environmentally unfriendly exhaust gases and/or emissions (e.g., carbon dioxide) into the environment. Additionally, highly combustible fuel (e.g., kerosene) is usually required to be transported and/or utilized (e.g., burned) near the aircraft for powering the gas turbine engine of the ground starter cart. The ground starter unit may also be required to be towed to the location of the aircraft.

Because of the concerns with emissions, costs, and energy consumption of gas powered starter carts, there is a need to develop ground support systems to provide high pressure air (e.g., pressurized or compressed air) to an aircraft in an economical, efficient, and environmentally friendly manner.

SUMMARY

The present application is directed to embodiments that relate to systems and apparatus to provide ground support services for an aircraft. The embodiments can provide the ground support services in an economical, efficient, and environmentally friendly manner. The ground support services can be provided to the aircraft while the aircraft is on the ground and the aircraft engines are powered down.

The embodiments may use electrical energy to drive an air source (e.g., a compressor or a pump) to provide or deliver air to one or more systems of the aircraft. For example, the embodiments may provide pressurized or compressed air to facilitate the starting of the aircraft engines. The embodiments may also supply compressed or pressurized air to the environmental control system (ECS) of the aircraft (e.g., an A/C pack) to enable temperature regulation of the cockpit, the cabin, storage areas, and components of the grounded aircraft.

Further, the embodiments may reduce fuel consumption and gas emissions associated with supplying ground support services. The embodiments may also eliminate burning of gas (e.g., kerosene) near the aircraft. For example, the embodiments may be powered by an energy or power source that supplies electrical energy. The electrical energy from the energy source may be used to power a motor assembly to drive an air source (e.g., a compressor) to produce pressurized or compressed air. The energy source may also enable electrical energy to be supplied to the aircraft, which may facilitate operation of a number of aviation systems, including communication systems, lighting systems, avionics, air conditioning systems, and the like. The energy source may include a battery or a fuel cell. Additionally, the electric energy provided to the aircraft may supplement power provided during operation of the engines while an aircraft is on the ground.

By using the embodiments to provide support services (e.g. utilities, air, etc.) for the aircraft, the lifetimes of the onboard components and systems (e.g., onboard starters, auxiliary power units (APUs), etc.) can be increased and the servicing and maintenance costs of the onboard systems (e.g., APUs)) can be reduced. The embodiments may include a ground support apparatus for providing the support services. The ground support apparatus may have a relatively compact design and be relatively inexpensive to manufacture compared to gas turbines starter carts. Further, the ground support apparatus may be portable and relatively light weight, allowing ground service personnel to readily move the ground support apparatus to various locations. For example, the ground support apparatus may be positioned or transported to a location in close proximity to the aircraft without requiring a tow vehicle. The ground support apparatus may be integrated with or transported by a chassis, such as an electric vehicle. Additionally, the ground support apparatus may be easily modified or reconfigured to adapt to different types and configurations of the systems of the aircraft.

In one aspect, a ground support apparatus for an aircraft is disclosed. The ground support apparatus may include at least one motor controller configured to receive input power and to supply output power. The ground support apparatus may also include a motor configured to receive the output power from the at least one motor controller. The motor may include a rotatable motor shaft. Further, the ground support apparatus may include a gearbox having an input shaft and an output shaft. The input shaft may be coupled to the rotatable motor shaft of the motor. Additionally, the ground support apparatus may include a compressor configured to generate compressed air. The compressor may include an impeller coupled to a compressor shaft and the compressor shaft may be coupled to the output shaft of the gearbox. A flexible duct coupled to the compressor may configured to provide the compressed air to the aircraft.

In another aspect, a portable apparatus for starting engines of an aircraft is disclosed. The portable apparatus may include a first controller configured to receive input power and to output a first three-phase alternating current power and a second controller configured to receive the input power and to output a second three-phase alternating current power. The portable apparatus may also include a motor configured to receive the first and second three-phase alternating current power. The motor may include a rotatable motor shaft. Further, the portable apparatus may also include a gearbox having an input shaft and an output shaft. The input shaft may be coupled to the rotatable motor shaft of the motor. Additionally, the portable apparatus may include a compressor for generating pressurized air. The compressor may include an impeller coupled to a compressor shaft and the compressor shaft coupled to the output shaft of the gearbox. A flexible duct may be configured to provide the pressurized air to the aircraft, The flexible duct may be coupled to the compressor.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
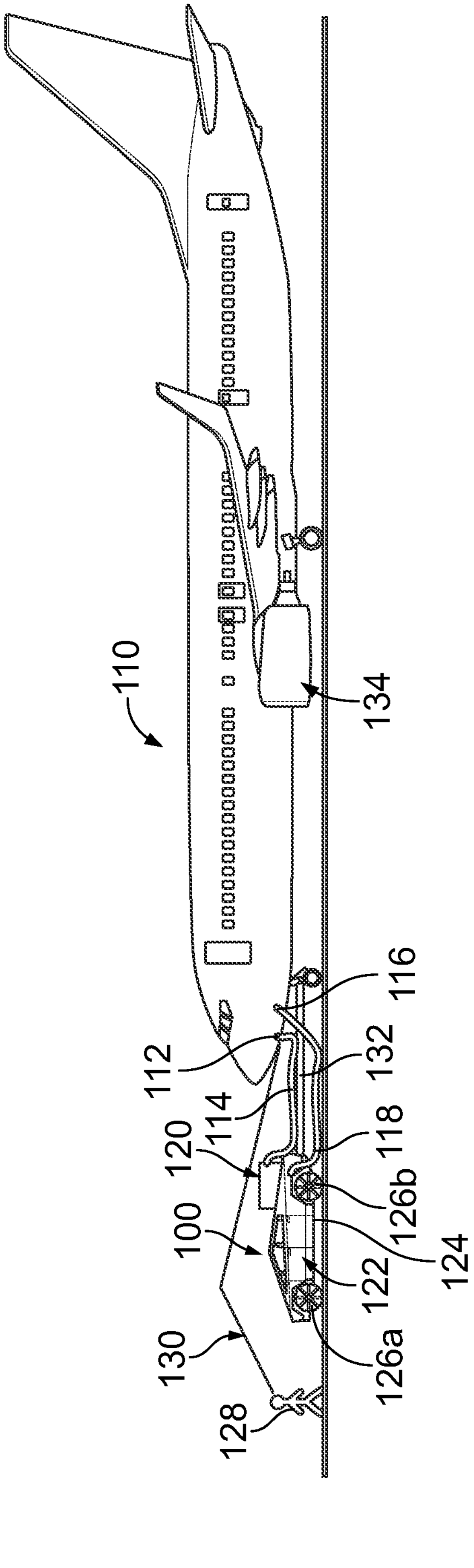
FIG. 1 illustrates an aircraft support system to provide support services for an aircraft, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number may be used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, motor controllers are illustrated and associated with reference number 242. When referring to a particular one of the motor controllers, such as the motor controller 242*a*, the distinguishing letter "a" is used. However, when referring to any arbitrary one of the motor controllers or to the motor controller as a group, the reference number 242 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring now to the drawings, and more particularly to FIG. 1, an exemplary embodiment of an aircraft support system 100 to provide ground support services (e.g., utilities, air, etc.) for an aircraft 110 is illustrated. The aircraft support system 100 can provide ground support services in an economical, efficient, and environmentally friendly manner. The ground support services may be provided to the aircraft while the aircraft 110 is on the ground and the aircraft engines are powered down.

As shown in FIG. 1, the aircraft support system 100 may be positioned at a location in close proximity to the aircraft 110. The aircraft support system 100 may be configured to supply or deliver to air, such as compressed or pressurized air, to one or more systems of the aircraft 110. The systems of the aircraft 110 may include a turbine starter, an environmental control system (ECS), a wing or engine anti-icing system, and/or any other system of the aircraft that utilizes air (e.g., compressed or pressurized air). The aircraft 110 may include an air inlet duct 112 or air inlet port configured for conveying air through the body or structure of the aircraft

110 to the aircraft systems. The aircraft support system 100 may be connected, via a flexible hose or duct 114, to the air inlet duct 112 of the aircraft 110.

The aircraft support system 100 may also be configured to provide electric energy to the aircraft. For example, the aircraft support system 100 may include an electrical energy source configured to provide electrical energy (e.g., power) to the aircraft 110 while aircraft 110 is on the ground. The aircraft may 110 include an external power receptacle 116 configured to receive the electrical energy from the aircraft support system 100 and to supply the electrical energy to one or more systems of the aircraft 110. For example, the aircraft support system 100 may supply the electrical energy to the external power receptacle 116 of the aircraft 110 via a power cable 118.

The aircraft support system 100 may include a ground support apparatus 120 or unit and a chassis 122. The chassis 122 may include a frame 124 mounted on wheels 126*a* and 126*b*. The frame 124 of the chassis 122 may be composed of steel, aluminum, or any other suitable high-strength material. The chassis 122 may also include a platform on which the ground support apparatus 120 may be carried or mounted. Further, the chassis 122 may enable the ground support apparatus 120 to be moved about an airport, an airfield, or an aircraft hangar so as to be put into position relative to the grounded aircraft 110. For example, the chassis 122 may enable the ground support apparatus 120 to be positioned adjacent to the grounded aircraft 110 to provide support services for the aircraft. In some embodiments, the chassis 122 may include an electric vehicle (EV), such as a Tesla truck. As shown in FIG. 1, the ground support apparatus 120 may be carried in the back of an electric truck; however, in other embodiments, the ground support apparatus 120 may be incorporated or integrated into a work cart, trailer, or other type of vehicle or support structure.

The chassis 122 of the aircraft support system 100 may also be configured to transport the ground servicing personnel 128 to the grounded aircraft 110. The ground servicing personnel 128 may assist with the servicing operations of the grounded aircraft 110 and can communicate with aircraft personnel over a communication line 130. Further, the chassis 122 may include a tow bar 132 to tow the aircraft 110 to a desired location, such as an airport gate or hanger. The ground support apparatus 120 can provide support services for the aircraft 110 while the aircraft 110 is being towing. For example, the ground support apparatus 120 can be used to start the aircraft engines 134 after pushing the aircraft 110 back from an airport gate. The foregoing aspects of the present disclosure are described more fully below.

Figure 2:
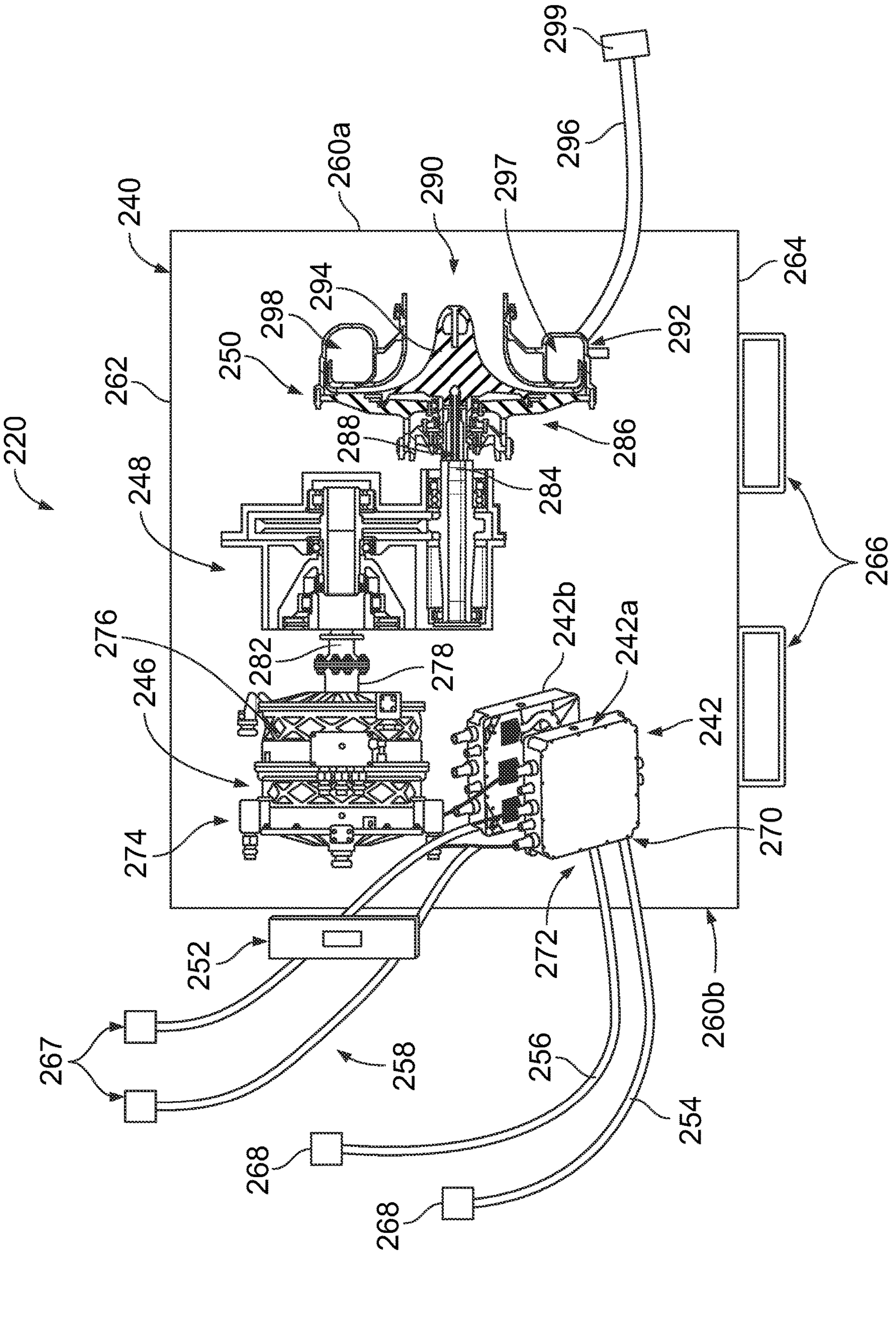
FIG. 2 is a cross-sectional view of a ground support apparatus, according to an exemplary embodiment.

FIG. 2 illustrates an exemplary embodiment of a ground support apparatus 220 to provide support services (e.g., air) for an aircraft (e.g., the aircraft 110 of FIG. 1). The ground support apparatus 220 can provide the support services in an economical, efficient, and environmentally friendly manner. The ground support apparatus 220 may be configured to produce pressurized or compressed air for one or more systems of the aircraft. For example, the ground support apparatus 220 may be used to provide or deliver pressurized air to start the engines of the aircraft (e.g., the engines 134 of the aircraft 110 of FIG. 1). The ground support apparatus 220 may also be used to provide pressurized air to an environmental control system (ECS) of the aircraft, such as an AC pack. The ECS of the aircraft may receive the compressed air from the ground support apparatus 220 and condition or regulate the compressed air to a desired temperature for the cabin of the aircraft.

As shown in FIG. 2, the ground support apparatus 220 includes a housing 240 or frame, one or more motor controllers 242 (two being shown), a motor assembly 246 (e.g., a motor), a gearbox 248, a compressor 250 or air pump, a control switch 252, an inlet fluid line 254, an outlet fluid line 256, and power cables 258 or lines. The housing 240 of the ground support apparatus 220 may comprise a rectangular structure having four side walls 260*a* and 260*b* (two being shown), a top 262, and a bottom 264. The housing 240 may have a plurality of ventilation air inlets (not shown) to allow the passage of air from the environment into the interior of the housing 240. Further, the housing 240 may also include one or more doors to enable ground service personnel or an operator to access the components or systems within the interior of the housing 240. Additionally, the housing 240 may include a forklift mount 266 to allow a forklift to lift and/or placed the ground support apparatus 220 on a chassis (e.g., the chassis 122 of FIG. 1).

The ground support apparatus 220 may be carried or transported by the chassis. For example, the chassis may allow ground service personal to move the ground support apparatus 220 to various locations in close proximity to the aircraft. As described above, the chassis may include a frame and a plurality of wheels coupled or attached to the frame. It will be recognized that the chassis can have various configurations to transport the ground support apparatus 220 about an airport, an airfield, or an aircraft hangar so as to be put into position relative to the aircraft being supported. For example, the chassis may comprise a vehicle, such as an electric truck with a flatbed. In other embodiments, the chassis may include a cart, a trailer, or other suitable structure capable of transporting the ground support apparatus 220 to desired locations.

The motor controllers 242 of the ground support apparatus 220 may be configured to receive electrical power from an energy or power source (not shown) via the power cables 258 and to supply the power to the motor assembly 246. The power source may be integrated into or carried by the chassis (e.g., electric vehicle) that may be configured to carry the ground support apparatus 220. In other embodiments, the power source may be including within the housing 240 of the ground support apparatus 220 as further described below. The power source may include a battery or a fuel cell. The power cables 258 may include fittings 267 or couplings that may be detachably coupled to power cables or lines that may to be connected to the aircraft. The fittings 267 may be configured for quick and easy connection to and disconnection from the power cables.

The motor controllers 242 may regulate the output power delivered to the motor assembly 246 for controlling the rotational speed, displacement, and/or torque of the motor assembly 246. In one or more embodiments, the motor controllers 242 may receive input power (e.g., a high-voltage, direct-current (HVDC) input power) from the power source and convert the input power to high-power output, such as, a high-voltage, multiphase alternating-current (HVAC) output power. In some embodiments, the motor controllers 242 may each output three-phase, high-voltage, alternating-current (AC) power for powering the motor assembly 246. The motor controllers 242 may also be configured to produce a low voltage.

The motor controllers 242 of the ground support apparatus 220 may also receive, via the inlet fluid line 254, fluid from a cooling system (not shown) to cool the circuitry and components disposed within the motor controllers 242. The cooling system may include a heat exchanger and a fluid reservoir. The cooling system may be integrated into or carried by the chassis (e.g., electric vehicle) as described above. In other embodiments, the cooling system may be including within the housing 240 of the ground support apparatus 220. The inlet fluid line 254 and the outlet fluid line 256 may be in fluid connection with the cooling system. The inlet fluid line 254 and the outlet fluid line 256 may each include a fitting 268 (e.g., a coupling). The fittings 268 may be detachably coupled to fluid lines that may to be connected to the aircraft. The fittings 268 maybe configured for quick and easy connection to and disconnection from the fluid lines.

The motor controllers 242 of the ground support apparatus 220 may include one or more fluid inlet ports 270 to receive the fluid from the cooling system. The fluid inlet ports 270 may be in fluid communication with an internal channel to direct fluid to flow into and through the motor controllers 242. A fluid line may be connected between the motor controllers 242 to enable the fluid to flow from the motor controller 242*a* to the motor controller 242*b*. The fluid may be formulated to absorb heat generated by the components of the motor controllers 242. Further, the motor controllers 242 may include one or more outlet fluid ports 272 to allow the fluid to exit the motor controllers 242 and return to the cooling system.

The motor assembly 246 of the ground support apparatus 220 may receive input power (e.g., a high-voltage, alternating current (HVAC)) from the motor controllers 242. The motor assembly 246 may include one or more electric power connector boxes to receive the electrical power. The motor assembly 246 can have any suitable power capabilities and/or requirements. The motor assembly 246 may be an electric motor, such as multi-phase (e.g., 3 phase) electric motor. In one or more embodiments, the motor assembly 246 may be wound as two independent 3-phase motors for redundancy and performance.

As shown in FIG. 2, the motor assembly 246 of the ground support apparatus 220 includes a stator assembly 274, a rotor assembly 276, and a main or motor shaft 278. The stator assembly 274 may include stator windings and may surround the rotor assembly 276 and the motor shaft 278. The rotor assembly 276 may be rotatably coupled to the stator assembly 274 and configured to rotate the motor shaft 278. The stator assembly 274 may be powered with multiphase (e.g., three phase) AC power to induce a rotary magnetic field that drives the rotor assembly 276. The motor assembly 246 may comprise an electric motor, such as an in-runner motor, an out-runner motor, or any other suitable type of electric motor. In some embodiments, the motor assembly 246 and motor controllers 242 may comprise a Magni350 Electric Propulsion system available from Magnix.

The motor assembly 246 of the ground support apparatus 220 may receive fluid to cool the circuits and components disposed within the motor assembly 246. In one or more embodiments, a conduit may extend between one or more of the motor controllers 242 and the motor assembly 246 to enable the fluid from the motor controllers 242 to be supplied to the motor assembly 246. The motor assembly 246 may include one or more fluid inlet ports connected to channels to direct the fluid to flow through the stator windings in the stator assembly 274. The motor assembly 246 may also include one or more outlet fluid ports to allow the fluid to exit the motor assembly 246 and return to the cooling system. The fluid may be outputted from the motor assembly 246 to the cooling system by the outlet fluid line 256.

The gearbox 248 of the ground support apparatus 220 may be coupled to the motor assembly 246. The gearbox 248 may include an input shaft 282 and an output shaft 284. As shown in FIG. 2, the input shaft 282 of the gearbox 248 is operatively coupled to the motor shaft 278 of the motor assembly 246. The input rotational speed applied at the input shaft 282 of the gearbox 248 may be transferred to an output rotational speed of the output shaft 284. For example, the gearbox 248 may mechanically translate a rotational speed of the input shaft 282 to a rotational output speed of the output shaft 284. In some embodiments, gearbox 248 may be a single speed, fixed gear gearbox, although it will be appreciated that other configurations may be employed such as a 2-gear gearbox.

The gearbox 248 may be configured for high or medium rotational speed (e.g., rotations per minute (rpm)) of the output shaft 284 of the gearbox 248. For example, the gearbox 248 may be configured so that the rotational speed at the output shaft 284 of the gearbox 248 is higher or greater than an input rotational speed applied at the input shaft 282 by the motor shaft 278 of the motor assembly 246. The output shaft 284 of the gearbox 248 may be operatively coupled to or connected directly to the compressor 250 of the ground support apparatus 220. The output shaft 284 of the gearbox 248 may be configured to provide the appropriate amount of power and rotational speed to the compressor 250 to pressurize or compress air to meet the pressure requirements of the systems of the aircraft.

The compressor 250 of the ground support apparatus 220 may be used to produce pressurized or compressed air for one or more systems of an aircraft. For example, the compressor 250 may be used to provide pressurized air to start an aircraft engine (e.g., the engines 134 of the aircraft 110 of FIG. 1). The compressor 250 may be configured to operate at variable speeds to achieve and maintain a desired pressure in the compressed air generated by compressor 250. The compressor 250 may comprise a shaft-driven compressor. For example, the compressor 250 may be a centrifugal compressor or radial compressor. In other embodiments, the compressor 250 may be implemented as an axial compressor, a reciprocating compressor, a screw-type air compressor, or a piston-type air compressor.

Figure 3:
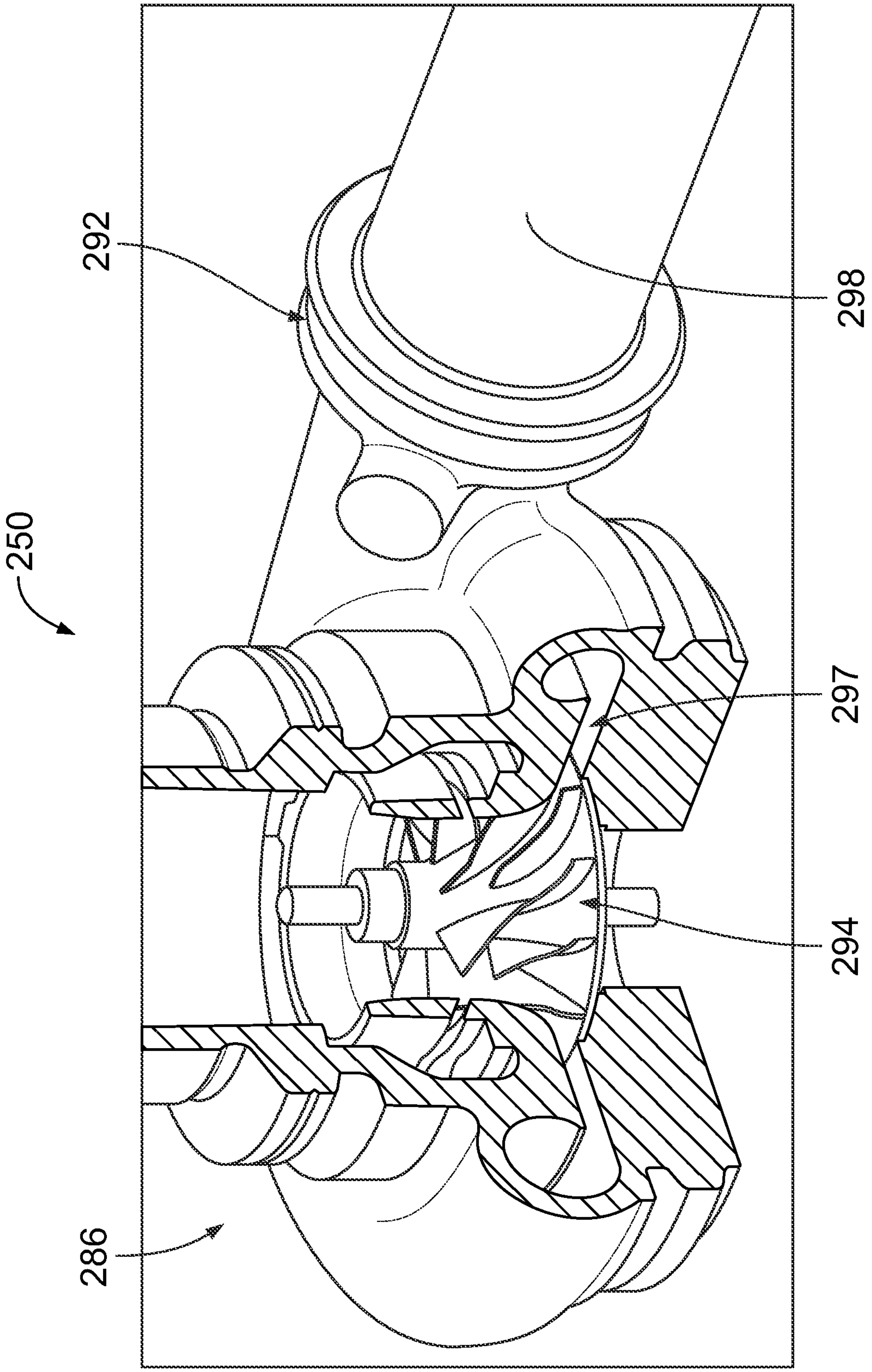
FIG. 3 is a perspective partial cut-away view of a compressor of the ground support apparatus of FIG. 2.

As shown in FIG. 2, the compressor 250 of the ground support apparatus 220 includes a housing 286 (e.g., a casing, a shroud, etc.) having a drive shaft 288, a compressor inlet 290, a compressor outlet 292, and an impeller 294. FIG. 3 shows a partial cross-sectional view of the compressor 250. The drive shaft 288 of the compressor 250 may be operatively coupled to the output shaft 284 of the gearbox 248. For example, the drive shaft 288 (and, thus, the impeller 294) may be driven by the output shaft 284 of the gearbox 248 that is powered by the motor assembly 246. The compressor inlet 290 of the compressor 250 may receive ambient air from the environment to enable air to be supplied to the impeller 294 of the compressor 250. In some embodiments, a duct or conduit may be fluidly coupled to the compressor inlet 290 to direct or supply air into the compressor 250. The compressor outlet 292 may be fluidly coupled to a hose 296 (e.g., line). The air produced by the compressor 250 may be directed through the compressor outlet 292 and provided, via the hose 296, to one or more aircraft systems that utilize pressurized air.

The impeller 294 of the compressor 250 may be disposed within the housing 286 and may be coupled to the drive shaft 288. The impeller 294 may have a conical shape and include a plurality of blades that are curved. The plurality of blades of the impeller 294 may spin or rotate the air, thereby increasing the velocity of the air. When the impeller 294 is rotated, the air entering the compressor 250, via the compressor inlet 290, is directed onto a first end (e.g., a front) of the impeller 294 along an axis about which the impeller 294 rotates. The air is rotated or spun to increase the velocity of the air. The air travels toward a second end (e.g., a rear, a radial outer edge opposite of the first end) of the impeller 294 where the air is forced through a plurality of vanes of the impeller 294 and into a diffuser 297.

The diffuser 297 of the compressor 250 gradually slows the velocity of the air, thereby increasing the pressure of the air. The air is discharged from the diffuser 297 into a collector 298 (e.g., a plenum). The hose 296 may be fluidly coupled to the compressor outlet 292 or collector 298 to provide the pressurized air to the aircraft. The hose 296 may be fluidly connected to an inlet duct of the aircraft for conveying the compressed air through the structure of the aircraft to one or more aircraft systems that uses the compressed air. The hose 296 may include a fitting 299 for detachably coupling the hose 296 to the inlet duct of the aircraft.

The control switch 252 of the ground support apparatus 220 may be mounted to the housing 240. The control switch 252 may be configured to start and/or stop the ground support apparatus 220. The control switch 252 may be a mechanically actuated switch that is connected in series between the energy source (e.g., a battery) and the ground support apparatus 220. For example, the control switch 252 may be an on/off switch for turning the ground support apparatus 220 'on' and 'off'. In other embodiments, the control switch 252 may include a rotary switch that can be rotated from an "off" position to a selected position corresponding to a level of input power for activating or powering the motor assembly 246. When the control switch 252 is turn "on", power may be supplied to the motor assembly 246 by the motor controllers 242. The motor assembly 246, via the gearbox 248, may cause the motor shaft 278 to rotate and thus cause the impeller 294 to rotate, which compresses air entering the compressor inlet 290 to a relatively higher pressure at the compressor outlet 292.

In one or more embodiments, the ground support apparatus 220 may also provide electrical energy or power to the aircraft being serviced on the ground. For example, the ground support apparatus 220 may include an energy or electrical source. The energy source may be contained within the housing 240 of the ground support apparatus 220. In some embodiments, the energy source may include a battery or a fuel cell. The energy source may provide power in the form of alternating current (AC) power at various frequencies and voltages and/or direct current (DC) power at various voltages as required by the aircraft being serviced. The required voltages and other parameters of the electrical power may differ from aircraft to aircraft. The energy source may provide power to the aircraft via a power cable. The power cable may be connected to an external power receptacle of the aircraft for supplying power to one or more aircraft systems.

In some embodiments, the ground support apparatus 220 may include a heating and/or air conditioner system. The heating and/or air conditioner system may be capable of producing conditioned air for the aircraft at desired parameters. The system may be contained within the housing of the ground support apparatus 220. In other embodiments, the system may be positioned in close proximity to (e.g., adjacent) the ground support apparatus 220. The system may receive the compressed air produced by the compressor 250 and heat or cool the compressed air to a predetermined temperature (e.g., increase or decrease the temperature of the pressurized air). For example, the heating and/or air conditioner system may be configured so that when the system is operating in a cooling mode, it will supply cool air at a specified flow rate and at a predetermined desired temperature. In some embodiments, the system may include a heat exchanger or a pre-cooler, piping, and the like to condition the air. The system may supply, via the hose 296, the conditioned compressed air to the aircraft.

In some embodiments, the ground support apparatus 220 may include a fluid cooling system (e.g., a heat exchange system, a cooling system, or the like) that may circulate fluid to cool components of the apparatus. The fluid cooling system may be contained within the housing of the ground support apparatus 220. In other embodiments, the fluid cooling system may be positioned in close proximity to (e.g., adjacent to) the ground support apparatus 220. The cooling system may include a conduit system that directs the cooling fluid to and through the motor controllers 242 and through motor assembly 246, and returns the fluid to the cooling system. In one or more embodiments, the cooling system may include a reservoir or tank configured to hold fluid, one or more pumps, and one or more heat exchangers.

Although the systems and apparatus are described herein with specific reference to aircraft, in other embodiments, the system and apparatus can be used with a vehicle other than an aircraft without departing from the essence of the present disclosure. It should also be recognized that other systems and components may also be included within the ground support apparatus.

For instances in this specification where one element is "coupled" to another element, the term can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A ground support apparatus for an aircraft comprising:

a set of motor controllers configured to receive input power and to supply output power, wherein the input power is supplied by a battery of an electric vehicle to create electrical energy, wherein the set of motor controllers is configured to provide a multiphase alternating-current output power, and wherein the set of motor controllers includes one or more fluid inlet ports configured to receive fluid from a cooling system, the one or more fluid inlet ports being in fluid communication with an internal channel to direct the fluid to flow through motor controllers of the set of motor controllers;

a switch configured to enable the input power supplied by the battery of the electric vehicle to be selectively provided to the set of motor controllers, wherein the switch is rotated from a first position to a selected position corresponding to a level of input power for activating a motor assembly;

a fluid line connected between the set of motor controllers to enable the fluid to flow between the set of motor controllers;

a set of fluid lines, connected to the aircraft, in fluid communication with the cooling system;

the motor assembly, powered by the electrical energy, configured to receive the output power from the set of motor controllers, wherein the motor assembly includes a rotatable motor shaft and two 3-phase motors;

a gearbox having an input shaft and an output shaft, wherein the input shaft is coupled to the rotatable motor shaft of the motor assembly;

a compressor, using the electrical energy, configured to generate compressed air, wherein the compressor includes an impeller coupled to a compressor shaft, and wherein the compressor shaft is coupled to the output shaft of the gearbox, wherein the compressor is configured to operate at variable speeds to maintain a desired air pressure for the compressed air, and wherein the compressor further comprises a diffuser configured to increase air pressure and a collector configured to receive the compressed air before delivery to the aircraft;

a heating or air conditioning system, within a housing of the ground support apparatus and powered by the electrical energy, configured to receive the compressed air from the compressor and condition the compressed air to a desired temperature before delivery to the aircraft; and a flexible duct configured to provide the compressed air to an environmental control system (ECS) of the aircraft to enable internal temperature regulation of the aircraft and to one or more engines of the aircraft to facilitate starting of each engine, and wherein the ground support apparatus is transportable by the electric vehicle.

2. The ground support apparatus according to claim 1, wherein the input power comprises a direct current power and the output power comprises a three-phase alternating current power.

3. The ground support apparatus according to claim 1, wherein the motor assembly comprises an electric motor.

4. The ground support apparatus according to claim 1, wherein the output shaft of the gearbox is configured to rotate at a faster speed than the input shaft.

5. The ground support apparatus according to claim 1, wherein the compressor includes an air inlet in fluid communication with an environment and an air outlet in fluid communication with the flexible duct, and wherein the flexible duct has a proximate end coupled to an air output of the compressor and a distal end configured to be coupled to the aircraft.

6. The ground support apparatus according to claim 1, wherein the set of motor controllers, the motor assembly, the gearbox, and the compressor are disposed within the housing.

7. The ground support apparatus according to claim 1, wherein the fluid is supplied from a fluid tank or reservoir.

8. The ground support apparatus according to claim 1, further comprising a heat exchanger configured to receive the fluid, wherein the heat exchanger is configured to transfer heat from the fluid.

9. The ground support apparatus according to claim 1, further comprising:

the battery having an output terminal; and a power cable having a proximate end coupled to the output terminal of the battery and a distal end configured to be coupled to the aircraft.

10. The ground support apparatus according to claim 1, wherein the ground support apparatus comprises a starter unit for starting one or more jet engines of the aircraft.

11. The ground support apparatus according to claim 1, wherein the electric vehicle includes a tow bar.

12. The ground support apparatus of claim 1, wherein the electric vehicle is an electric truck having a bed, and wherein the ground support apparatus is configured to be positioned on the bed of the electric truck.

13. The ground support apparatus of claim 1, wherein the compressor is a radial compressor.

14. The ground support apparatus of claim 1, further comprising:

a conduit that extends between one or more of the motor controllers and the motor assembly to enable the fluid to be supplied from the set of motor controllers to the motor assembly.

15. The ground support apparatus according to claim 1, wherein the switch is connected in series between the battery and the ground support apparatus.

16. A portable apparatus for starting engines of an aircraft comprising:

a first controller configured to receive input power and to output a multiphase alternating-current output power, wherein the first controller includes one or more fluid inlet ports configured to receive fluid from a cooling system and direct the fluid to flow through the first controller;

a second controller configured to receive the input power and to output the multiphase alternating-current output power, wherein the input power is supplied by a battery of an electric vehicle;

a control switch configured to enable the input power to be selectively provided to the first controller and the second controller, wherein the control switch is rotated from a first position to a selected position corresponding to a level of input power for activating a motor assembly;

a fluid line connected between the first controller and the second controller to enable the fluid to flow between the first controller and the second controller, wherein the second controller includes one or more fluid inlet ports configured to receive the fluid from the fluid line and direct the fluid to flow through the second controller;

a set of fluid lines, connected to the aircraft, in fluid communication with the cooling system;

the motor assembly configured to receive the multiphase alternating-current output power, wherein the motor assembly includes a rotatable motor shaft and two 3-phase motors;

a gearbox having an input shaft and an output shaft, wherein the input shaft is coupled to the rotatable motor shaft of the motor assembly;

a compressor for generating pressurized air, wherein the compressor includes an impeller coupled to a compressor shaft, and wherein the compressor shaft is coupled to the output shaft of the gearbox, wherein the compressor is configured to operate at variable speeds to maintain a desired air pressure for the pressurized air, and wherein the compressor further comprises a diffuser configured to increase air pressure and a collector configured to receive the pressurized air before delivery to the aircraft;

a heating or air conditioning system, within a housing of the portable apparatus, configured to receive the pressurized air from the compressor and condition the pressurized air to a desired temperature before delivery to the aircraft; and a flexible duct configured to provide the pressurized air to an environmental control system (ECS) of the aircraft to enable internal temperature regulation of the aircraft and to one or more engines of the aircraft to facilitate starting of each engine, wherein the flexible duct is coupled to the compressor, and wherein the portable apparatus is transportable by the electric vehicle.

17. The portable apparatus of claim 16, wherein the first controller, the second controller, the motor assembly, the gearbox, and the compressor are disposed within the housing, and wherein the housing is configured to be transported by the electric vehicle.

18. The portable apparatus of claim 16, wherein the motor assembly comprises an electric motor.

19. The portable apparatus of claim 16, wherein the electric vehicle is an electric truck having a bed, and wherein the portable apparatus is configured to be positioned on the bed of the electric truck.

20. The portable apparatus of claim 16, wherein the compressor is a radial compressor.

21. The portable apparatus of claim 16, wherein the electric vehicle includes a tow bar.

* * * * *